(12) United States Patent
Bragman

(10) Patent No.: US 8,881,668 B2
(45) Date of Patent: Nov. 11, 2014

(54) FLUSH MOUNT ROD HOLDER WITH PAD EYE

(71) Applicant: William Alan Bragman, Bellaire, TX (US)

(72) Inventor: William Alan Bragman, Bellaire, TX (US)

( * ) Notice: Subject to any disclaimer, the term of this patent is extended or adjusted under 35 U.S.C. 154(b) by 0 days.

(21) Appl. No.: 13/681,398

(22) Filed: Nov. 19, 2012

(65) Prior Publication Data

US 2014/0137791 A1   May 22, 2014

(51) Int. Cl.
*B63B 17/00*      (2006.01)
*A01K 97/10*      (2006.01)

(52) U.S. Cl.
CPC ................. *A01K 97/10* (2013.01); *B63B 17/00* (2013.01)
USPC ............................................ 114/364; 43/21.2

(58) Field of Classification Search
USPC ...................... 43/21.2; 248/538, 539; 114/364
See application file for complete search history.

(56) References Cited

U.S. PATENT DOCUMENTS

| | | | | |
|---|---|---|---|---|
| 3,570,793 A | | 3/1971 | Shackel | |
| 4,485,579 A | * | 12/1984 | Hawie | 43/21.2 |
| 4,778,141 A | * | 10/1988 | Bogar | 248/538 |
| 4,836,127 A | * | 6/1989 | Wille | 114/343 |
| 5,065,540 A | * | 11/1991 | Potter, Jr. | 43/21.2 |
| 5,163,244 A | * | 11/1992 | Rupp | 43/21.2 |
| 5,921,196 A | * | 7/1999 | Slatter | 114/255 |
| 5,937,564 A | * | 8/1999 | Perreault | 43/4.5 |
| 6,626,409 B1 | * | 9/2003 | Thompson | 248/539 |
| 6,993,865 B2 | * | 2/2006 | Peters et al. | 43/21.2 |
| 7,131,232 B1 | | 11/2006 | Fecht | |
| 8,291,636 B2 | * | 10/2012 | Wilcox et al. | 43/21.2 |

\* cited by examiner

*Primary Examiner* — Lars A Olson
*Assistant Examiner* — Jovon Hayes
(74) *Attorney, Agent, or Firm* — Kenneth A. Roddy

(57) ABSTRACT

A flush mount fishing rod holder has a tubular rod holding tube adapted to be received through an opening in a panel of a watercraft, a mounting flange surrounding the top end the rod holding tube. An attachment member on the upper surface of the mounting flange has an upwardly extending curved portion defining a pad eye opening therebetween and an attachment point for connecting a flexible tether line attached to a fishing rod supported in the holder or to other onboard to items to maintain it tethered to the watercraft and prevent accidental loss of the rod or other item should it be dropped or pulled overboard or the watercraft overturns.

4 Claims, 3 Drawing Sheets

FLUSH MOUNT ROD HOLDER WITH PAD EYE

CROSS REFERENCE TO RELATED APPLICATION

This application claims priority of U.S. Provisional Application Ser. No. 61/629,340, filed Nov. 17, 2011, the pendency of which is extended until Nov. 19, 2012 under 35 U.S.C. 119(e)(3).

BACKGROUND OF THE INVENTION

1. Field of the Invention

This invention relates generally to flush mount fishing rod holders, and, more particularly to a flush mount rod holder having tubular fishing rod holding tube adapted to be received through an opening in a panel of a watercraft, a mounting flange surrounding the top end the rod holding tube, and an upwardly extending curved attachment member on the mounting flange defining a pad eye opening therebetween for connecting a flexible tether line attached to a fishing rod supported in the holder or to other to items to prevent accidental loss of the rod or other item should it be dropped or pulled overboard or the watercraft overturns.

2. Background Art

Conventional fishing rod holders are well known for their functionality in holding most any style fishing rod and when "trolling" to attract and catch fish. Most fishing boats utilizing the trolling method have various types of fixed fishing rod holders positioned around the gunwales, the cover boards, or the top decks to hold the rods vertically upright or at angles relative to a vertical axis.

A popular type of rod holder, known as a "flush-mounted rod holder" or "flush mount rod holder" has a rod-holding tube enclosed at a lower end and a radial mounting plate or flange surrounding the open top end which is attached to a mounting surface on the watercraft such that the rod-holding tube extends downward below the mounting plate or flange and the surface to which it is attached. Some flush mount rod holders have a rod or pin that is secured transversely across the rod-holding tube at a lower end, also known as a "gimbal" that receives and engages a horizontal nock or slot at the butt end of the handle of a conventional fishing rod of the type provided with a gimbal butt end, to prevent the rod and reel from rotating relative to the rod-holding tube.

Typically, the fishing rod and reel is removed from the rod holder and held in the hands of the fisherman after a fish strikes the bait. On some occasions, should a large fish strike the bait, the rod and reel may be pulled out of the rod holder, out of the hands of the fisherman, or simply accidentally dropped overboard and irretrievably lost in the water, or if the watercraft should encounter rough water or overturn.

There several patents directed toward improvements to flush mount rod holders and patents directed toward somewhat complex apparatus for temporarily securing a fishing rod in a rod holder while fishing, during the interval between fish strikes.

Wilcox et al, U.S. Pat. No. 8,281,636, discloses a fishing rod holder having a generally annular mounting bezel which generally surrounds the mouth of a tube for receiving the butt of a fishing rod. The underside of the mounting bezel includes at least one blind hole or projecting mounting stud for receiving a fastener for securely mounting the fishing rod holder to a panel member of a marine vessel without penetrating the exposed upper surface of the mounting bezel in order to provide an aesthetically pleasing appearance.

Fecht, U.S. Pat. No. 7,131,232 discloses a fishing rod holder and clamp apparatus for temporarily securing a fishing rod in position while fishing, during the interval between fish strikes, having a fixed hollow tubular holder for the rod handle inserted in one end of the holder, the holder having an opening on the top, and having a clamp hingedly attached to one end of the opening, the clamp and opening being of a form allowing the user to secure the rod handle within the holder, by pressing down upon the clamp; and to free the rod handle from the holder by pulling up on the clamp.

Peters et al, U.S. Pat. No. 6,993,865, discloses a two-piece rod holder assembly formed from an upper flange member securable to receiving a socket mounted beneath a gunnel surface. The upper flange has concealed fastening bosses located beneath the flange member which are used to engage fasteners that secure a backing plate that is coupled to the receiving socket. The backing plate can be attached directly to the lower surface of the gunnel (or gunwale) wherein removal of the upper flange allows for refinishing of the mounting surface and/or the upper flange, without disturbing the receiving socket mounted position. The lower end of the receiving socket may includes a stop member for engaging the butt of a fishing rod handle.

Rupp, U.S. Pat. No. 5,163,244, discloses an improved striking fishing rod holder for permanent installation on the cockpit gunnel or other location of a fishing boat is disclosed that enables hook-setting movement of the rod upon a fish strike of the bait trolled from the rod without removal of the rod from the holder. The holder includes a mounting plate assembly, a depending tubular member hinged to the plate assembly that swings from a troll position to a hit position and a detent assembly to releasably hold the tubular member alternatively in the troll or hit position.

Potter Jr., U.S. Pat. No. 5,065,540, discloses a striking rod holder that includes a first plate, a rod holding tube attached to the first plate, and a second plate for attaching to a surface, where the first plate pivotally attaches to the second plate. A cushion material may be positioned between the first plate and the second plate. A locking device can further be included with the striking rod holder to maintain the tube in a fixed position.

Bogar, U.S. Pat. No. 4,778,141, discloses fishing rod holder having a vertically elongated body defining a longitudinally extending and upwardly opening receiving socket for receiving the handle end of a fishing rod. The socket includes a long upper end portion and a relatively short lower end portion and the upper and lower end portions include corresponding transverse long X axes and short Y axes. Side walls of the socket defining the limits of the X axis of the upper end portion are downwardly divergent defining an included angle of approximately 20° and the side walls of the socket defining the X axis of the lower end portion of the socket are downwardly divergent and define an included angle of approximately 20°, the socket includes a generally circular cross-section in an interlineation zone between the upper and lower end portions of the socket. Further, the lower end portions of the socket include structure effectively blocking movement of a fishing rod handle downwardly therethrough.

Hawie, U.S. Pat. No. 4,485,579 discloses a multi-rod holder and alignment device which is removably-securable in non-rotating position within a conventional rod holder mounted on a boat. The device has a support stem having two or more lower alignment slots, and two or more upper rod-holder tubes which extend substantially vertically, relative to the support stem, each tube designed to receive a fishing rod handle and having alignment pins for securing the fishing rod against rotation therewithin.

Schackel, U.S. Pat. No. 3,570,793 discloses a pair of fishing rod holders for supporting a fishing rod in a selected orientation on a boat or other supporting surface. In each embodiment, the handle of the rod is seated in a support mounted at the upper end of an upright post, and a spring-biased keeper, mounted on the support, is movable between a first position in which it prevents removal of the fishing rod handle from its seat, and a second position in which it allows the handle to be inserted into or removed from its seat. In one embodiment the lower end of the post can be mounted in the oarlock of a boat, and in the other embodiment the post can be mounted in a boat gunnel.

SUMMARY OF THE INVENTION

The present invention overcomes the aforementioned problems and is distinguished over the prior art in general, and these patents in particular by a flush mount fishing rod holder mountable in an opening in a panel of a watercraft. The flush mount fishing rod holder has a hollow tubular fishing rod holding tube having an enclosed lower end, an open top end, an interior for receiving a handle portion of the fishing rod, and an outer wall adapted to be received through the opening in the panel of the watercraft. An integrally formed mounting flange surrounds the open top end of the rod holding tube and has an outer peripheral edge spaced outwardly from the open top end. The mounting flange has a bottom surface facing an upper surface of the panel when the rod holding tube is received in the opening in the panel, and has an upper surface which lies above the upper surface of the panel when the rod holder is mounted. Mounting holes spaced outwardly from the open top end of the rod holding tube extend through the mounting flange for receiving fasteners to secure the fishing rod holder to the panel of the watercraft. An attachment member on the mounting flange has an outwardly curved portion extending upwardly from the upper surface of the mounting flange and defines a pad eye opening therebetween. The outwardly curved portion of the attachment member defines a point of attachment for connecting a flexible tether line or leash attached at a free end to a fishing rod supported in the rod holding tube or to other onboard items to maintain it tethered to the watercraft and prevent accidental loss of the rod or other item should it be dropped or pulled overboard or the watercraft overturns.

DESCRIPTION OF THE PREFERRED EMBODIMENT

As used herein in conjunction with the present invention, the following terms have the following meanings. The term "pad eye" means a loop-shaped member or projection having an outwardly curved portion that provides a point of attachment. The term "gimbal" means a crossbar that extends transversely across the inside diameter of the lower end of a rod holding tube of a fishing rod holder that receives and engages a horizontal nock or slot at the butt end of the handle of a conventional fishing rod of the type provided with a gimbal butt end, and prevents the rod and reel from rotating relative to the rod-receiving tube.

Figure 1:
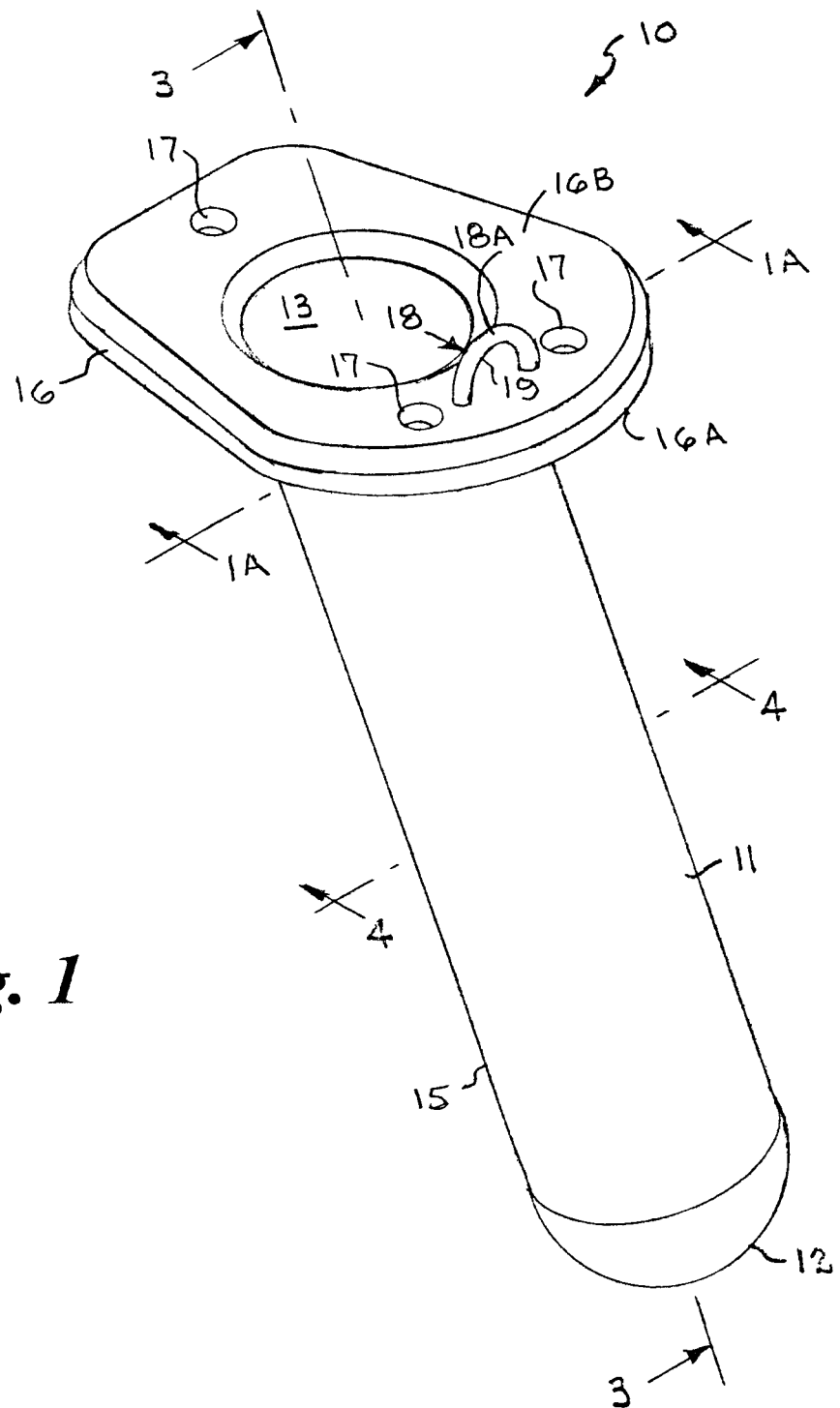
FIG. 1 is a perspective view of a first embodiment of the flush mount rod holder in accordance with the present invention having an integrally formed upwardly extending curved attachment member on the mounting flange.
Figure 2:
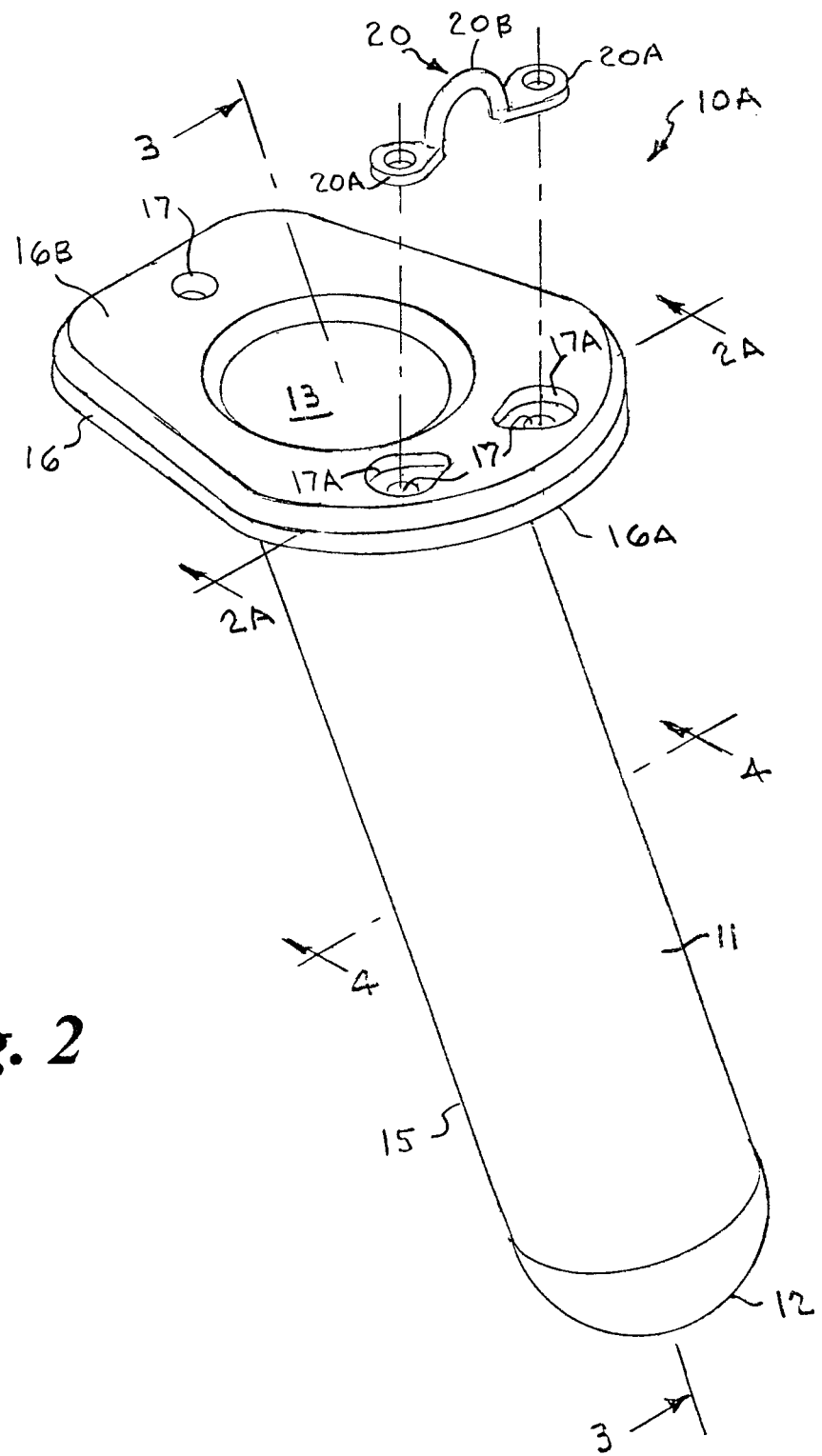
FIG. 2 is an exploded perspective view of a second embodiment of the flush mount rod holder in accordance with the present invention having a pad eye attachment member on the mounting flange, shown with the pad eye in an unassembled condition
Figure 1A:
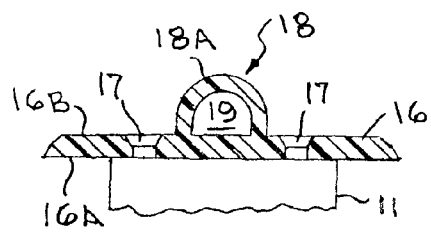
FIG. 1A is a transverse cross sectional view taken along line 1A of FIG. 1 showing the integrally formed upwardly extending curved attachment member and mounting holes of the mounting flange.
Figure 2A:
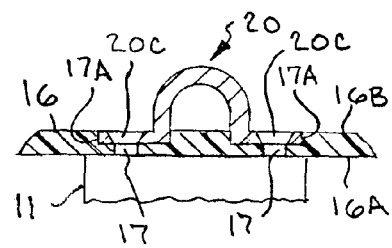
FIG. 2A is a transverse cross sectional view taken along line 2A of FIG. 2 showing the pad eye attachment member installed in recesses of the mounting flange and mounting holes extending therethrough.

Referring now to the drawings by numerals of reference, a first embodiment the mount rod holder 10 is shown in FIGS. 1 and 1A, and a second embodiment of the flush mount rod holder 10A is shown in FIGS. 2 and 2A. The first and second embodiments of the flush mount rod holders differ in that the first embodiment 10 has an integrally formed upwardly extending curved attachment member, and the second embodiment 10A has a pad eye attachment member installed in recesses in the mounting flange, as described in detail hereinafter.

Figure 3:
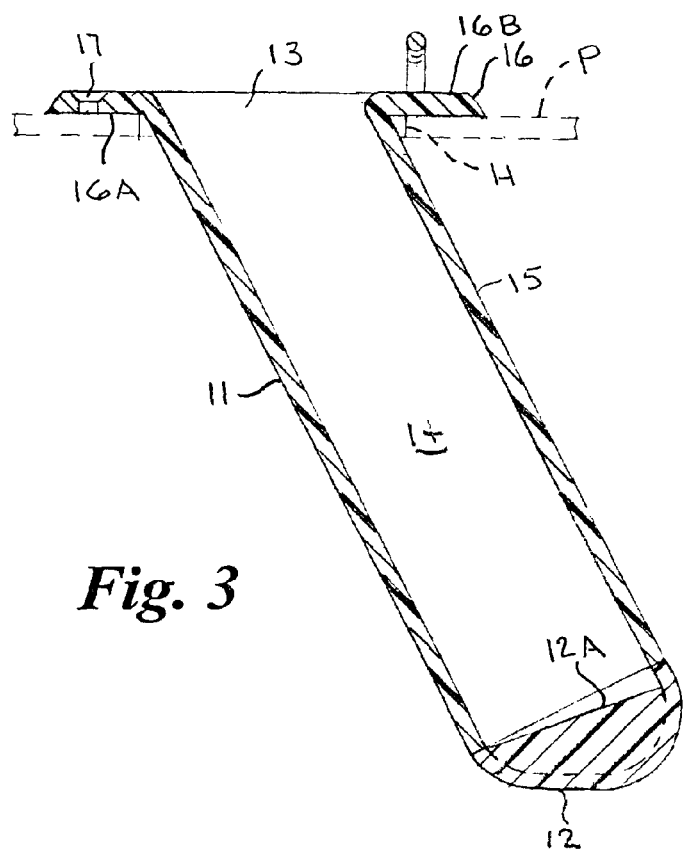
FIG. 3 is a longitudinal cross sectional view of the of the flush mount rod holders taken along line 3-3 of FIGS. 1 and 2.
Figure 4:
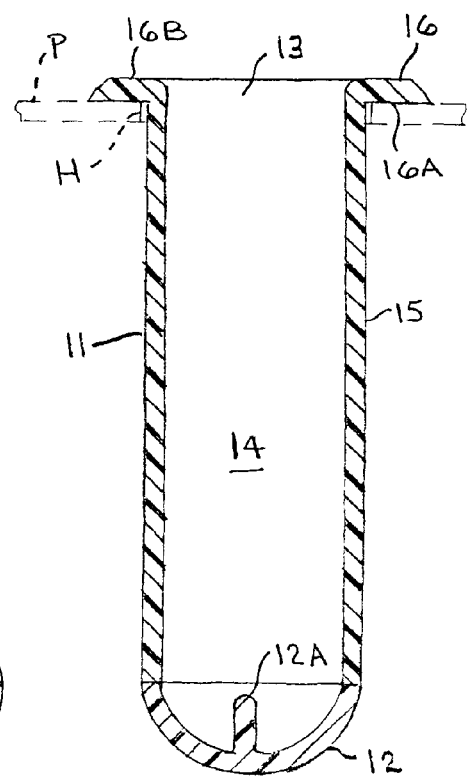
FIG. 4 is a longitudinal cross sectional view of the of the flush mount rod holders taken along line 4-4 of FIGS. 1 and 2.

The other features of the first and second embodiments of the flush mount rod holders 10 and 10A, as seen in the longitudinal cross sectional views of FIG. 3 and FIG. 4 are essentially the same and are assigned the same numerals of reference.

The flush mount rod holders 10 and 10A each have a hollow tubular fishing rod holding tube 11 with a bottom end enclosed by an end cap 12, an open top end 13, defining an interior 14 for receiving a handle portion of a fishing rod, and an outer wall 15 adapted to be received through an opening H in a panel P of a watercraft (shown in dashed line). The end cap 12 may be adjoined to the bottom end of the rod holding tube 11 by conventional means such as epoxy or ultrasonic welding.

As best seen in FIGS. 3 and 4, a thin generally rectangular crossbar 12A extends a short distance upwardly from the enclosed bottom end of the rod holding tube 11 and transversely across the interior 14 of the rod holding tube to receive and engage a horizontal nock or slot at the butt end of a handle of a conventional fishing rod of the type provided with a gimbal butt end, and prevents the rod from rotating relative to the rod holding tube. In the illustrated example, the crossbar 12A is shown to be integrally formed with the end cap 12. However, it should be understood that crossbar 12A may be adjoined to the end cap 12 or adjoined to the bottom end of the rod holding tube 11 by conventional means such as epoxy or ultrasonic welding.

An integrally formed mounting flange 16 surrounds the open top end 13 of the rod holding tube 11 and has an outer peripheral edge spaced outwardly from the open top end. In the illustrated example, the mounting flange 16 is shown as a generally rectangular four-sided configuration, however it should be understood the mounting flange may be circular or other shapes.

The mounting flange 16 has a bottom surface 16A facing an upper surface of the panel P when the rod holding tube 11 is received in the opening H in the panel, and an upper surface 16B which lies above the upper surface of the panel when the rod holder 10 or 10A is mounted.

Mounting holes 17 spaced outwardly from the open top end 13 of the rod holding tube 11 extend vertically through the mounting flange 16 for receiving conventional fasteners, such as machine screws and lock nuts or tri grip rivets, to secure the fishing rod holder 10 or 10A to the panel P of the watercraft. In the illustrated example, but not limited thereto, three mounting holes are shown.

As shown in FIGS. 1 and 1A, the first embodiment of the flush mount rod holder 10 has an attachment member 18 integrally formed on the upper surface 16B of the mounting flange 16. The attachment member 18 has an outwardly curved portion 18A extending upwardly from the upper surface 16B of the mounting flange 16 defining a pad eye opening 19 therebetween. The outwardly curved portion 18A of the attachment member 18 provides a point of attachment for connecting a flexible tether line or leash attached at a free end to a fishing rod supported in the fishing rod holding tube 11 or to other onboard items to prevent accidental loss of the rod or other item should it be dropped or pulled overboard or the watercraft overturns to maintain it tethered to the watercraft.

As shown in FIGS. 2 and 2A, in the second embodiment of the flush mount rod holder 10A the attachment member is a pad eye 20 that is secured to the upper surface 16B of the mounting flange 16 during the mounting operation. In this modification, the upper surface 16B of the mounting flange 16 has a pair of recessed apertures 17A, each surrounding two of the mounting holes 17, respectively, which are disposed adjacent to one another. The pad eye attachment member 20 has a flange 20A at each lower end of its upwardly extending outwardly curved portion 20B configured to be received in the recessed apertures 17A, and a hole 20C extends through each flange in axial alignment with a respective adjacent mounting hole 17. The pad eye attachment member 20 is secured on the mounting flange 16 by two of the conventional fasteners that secure the fishing rod holder 10A to the panel P of the watercraft.

Although the flush mount rod holders have been shown and described, for purposes of example, as having a generally rectangular mounting flange and a rod holding tube disposed at an angle relative to a vertical axis, it should be understood that the present the flush mount rod holders may have a circular mounting flange and a rod holding tube disposed perpendicular to the mounting flange extending along a vertical axis.

The present flush mount rod holders are installed on the watercraft by inserting the rod holding tube through a hole formed in the top deck of the watercraft (typically behind the cockpit if installed on a kayak) and the mounting flange is secured to the top deck by conventional fasteners, such as threaded fasteners and lock nuts or rivets passed through smaller holes drilled in the top deck in a well-known manner.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. An improved flush mount fishing rod holder mountable in an opening in a panel of a watercraft, the rod holder having hollow tubular fishing rod holding tube with an enclosed lower end, an open top end, an interior for receiving a handle portion of a fishing rod, and an outer wall adapted to be received through the opening in the panel, an integrally formed mounting flange surrounding the open top end of the rod holding tube and having an outer peripheral edge spaced outwardly from the open top end, the mounting flange having a bottom surface facing an upper surface of the panel when the rod holding tube is received in the opening in the panel, and the mounting flange having an upper surface which lies above the upper surface of the panel when the rod holder is mounted, and mounting holes extending through the mounting flange spaced outwardly from the open top end of the rod holding tube for receiving fasteners to secure the fishing rod holder to the panel; the improvement comprising:

an attachment member having an outwardly curved portion extending upwardly from said mounting flange upper surface defining a pad eye opening therebetween, said outwardly curved portion of said attachment member defining a point of attachment for connecting a flexible tether line or leash attached at a free end to a fishing rod supported in said fishing rod holding tube to maintain it tethered to the watercraft.

2. The improved flush mount fishing rod holder according to claim 1, wherein
said attachment member is integrally formed on said mounting flange upper surface.

3. The improved flush mount fishing rod holder according to claim 1, wherein
said attachment member is secured on said mounting flange by at least two of the fasteners that secure said fishing rod holder to the panel.

4. The improved flush mount fishing rod holder according to claim 3, wherein
said mounting flange upper surface has a pair of recessed apertures, each surrounding two of said mounting holes, respectively, that are disposed adjacent to one another; and
said attachment member is a pad eye having a flange at each lower end of said upwardly extending outwardly curved portion configured to be received in said recessed apertures, and a hole extending through each said flange in axial alignment with a respective said adjacent mounting hole; and
said pad eye attachment member is secured on said mounting flange by at least two of the fasteners that secure said fishing rod holder to the panel.

* * * * *